US009696239B2

(12) United States Patent
Gu et al.

(10) Patent No.: US 9,696,239 B2
(45) Date of Patent: Jul. 4, 2017

(54) METHOD AND APPARATUS FOR MONITORING TURBINE EFFICIENCY OF AIRCRAFT AUXILIARY POWER UNIT

(71) Applicant: Air China Limited, Beijing (CN)

(72) Inventors: Zhuping Gu, Beijing (CN); Chi Zhang, Beijing (CN); Lei Huang, Beijing (CN); Huifeng Ding, Beijing (CN); Jiaju Wu, Beijing (CN); Yanfeng Zhang, Beijing (CN); Hongtao Ma, Beijing (CN); Lei Chen, Beijing (CN)

(73) Assignee: Air China Limited, Beijing (CN)

( * ) Notice: Subject to any disclaimer, the term of this patent is extended or adjusted under 35 U.S.C. 154(b) by 204 days.

(21) Appl. No.: 14/338,553

(22) Filed: Jul. 23, 2014

(65) Prior Publication Data
US 2016/0195455 A1 Jul. 7, 2016

(30) Foreign Application Priority Data

Jul. 24, 2013 (CN) .......................... 2013 1 0313879

(51) Int. Cl.
*G01M 15/14* (2006.01)
*F02C 9/00* (2006.01)
(Continued)

(52) U.S. Cl.
CPC ........... *G01M 15/14* (2013.01); *F01D 21/003* (2013.01); *F02C 7/26* (2013.01); *F02C 9/00* (2013.01);
(Continued)

(58) Field of Classification Search
CPC ............. F05D 2260/80; F05D 2220/50; F05D 2260/821; B64D 41/00; G01M 15/14
(Continued)

(56) References Cited

U.S. PATENT DOCUMENTS

| 2007/0234734 A1 | 10/2007 | Uluyol et al. |
| 2007/0260390 A1 | 11/2007 | Kim et al. |
| 2010/0303611 A1 | 12/2010 | Kim |

FOREIGN PATENT DOCUMENTS

| CN | 102416821 A | * | 4/2012 | ............. G06Q 10/00 |
| CN | 102866014 A | | 1/2013 | |
| EP | 2544064 A2 | | 9/2013 | |

OTHER PUBLICATIONS

Luca Marinai et al., "Detection and Prediction of the Performance Deterioration of a Turbofan Engine" Proceedings of the International Gas Turbine Congress Tokyo, Nov. 2-7, 2003, 7 pages.
(Continued)

*Primary Examiner* — Daniel S Larkin
*Assistant Examiner* — Anthony W Megna Fuentes
(74) *Attorney, Agent, or Firm* — Brundidge & Stanger, P.C.

(57) ABSTRACT

The present invention relates to a method and device for monitoring performance of an auxiliary power unit (APU) turbine efficiency of an aircraft. The method comprises: obtaining APU messages at multiple time points within a period; obtaining APU startup parameters including at least a rotation speed at a peak of EGT according to the APU messages; calculating a percentage NPA of the rotation speed when the exhausting gas temperature EGT reaches its peak at the APU startup stage relative to the rotation speed in the APU normal operation; calculating the average of the NPA within the period; and determining which of the stable, decline and failure phases the APU turbine efficiency is in according to the average of the NPA.

12 Claims, 7 Drawing Sheets

(51) Int. Cl.
  *F01D 21/00*  (2006.01)
  *G07C 3/00*  (2006.01)
  *F02C 7/26*  (2006.01)
(52) U.S. Cl.
  CPC ............ *G07C 3/00* (2013.01); *F05D 2220/50* (2013.01); *F05D 2260/80* (2013.01); *F05D 2260/821* (2013.01); *Y02T 50/671* (2013.01)
(58) Field of Classification Search
  USPC ..................................................... 73/112.03
  See application file for complete search history.

(56) References Cited

OTHER PUBLICATIONS

European search report issued in EP Patent Application No. 14178430 on Oct. 29, 2014, 12 pages.

* cited by examiner

APU MES/IDLE REPORT <13>

|    | A/C ID<br>Plane No. | DATE UTC<br>UTC Time | FROM<br>Flying | TO<br>Ground | FLT<br>Flight No. | |
|----|---|---|---|---|---|---|
| CC | BXXXX | yyyy-dd-mm xx:xx:xx | - | - | - | |
|    | PH<br>Segment | CNT<br>Count | CODE<br>Trigger Code | BLEEDSTATUS<br>State of Bleed Air Valve | | APU<br>Bleed Air Valve of APU |
| C1 | 11 | 76401 | 4000 | 16 0000 1 00000 19 | | 1 |
|    | TAT<br>Total Temperature | ALT<br>Datum Mark | CAS<br>Calculation of airspeed | MN<br>Mach Speed | GW<br>Total Weight | CG<br>Gravity Center | DMU<br>Version |
| CE | 23.3 | 150 | - | - | 65600 | 29.2 | 171CA2 |
|    | ASN<br>APU Serial Number | AHRS<br>APU Hours | ACYC<br>APU Cycle | PHAD<br>APU Performance Adjustment | | |
| E1 | 2056 | 18477 | 16894 | 4000 | | |
|    | ESN<br>Engine No. | ACW1<br>Control Word 1 | ACW2<br>Control Word 2 | NA<br>Rotation Speed | EGTA<br>Exhausted Gas Temperature | IGV<br>IGV Position |
| N1 | 011909 | 00000 | 0A000 | 99.7 | 588 | -5 |
| N2 | 011473 | 00000 | 0A000 | 99.8 | 580 | -5 |
| N3 | 000000 | 00000 | 04000 | 99.8 | 388 | 82 |
|    | P2A<br>Inlet Gas pressure | LCIT<br>Inlet Temperature of Load Compressor | WB<br>Bleed Air Flow | PT<br>Bleed Air pressure | LCDT<br>Outlet Temperature of Load Compressor | OTA<br>Lube Oil Temperature | GLA<br>APU Generator Load |
| S1 | .956 | 33 | .41 | 3.99 | XXXX | 110 | 38 |
| S2 | .952 | 32 | .41 | 3.99 | XXXX | 110 | 27 |
| S3 | .96 | 32 | 0 | 1.17 | XXXX | 107 | 0 |
|    | STA | EGIP | NPA | OTA | ICIT | | |
|    | PREVIOUS APU START(Parameters on start of APU) | | | | | | |
|    | Start Time | EGT Peak Value | Rotation Speed at Peak Value of EGT | Lube Oil Temperature | Inlet Temperature of Load Compressor | | |
| V1 | 49 | 808 | 35 | 110 | 32 | | |

Figure 3

METHOD AND APPARATUS FOR MONITORING TURBINE EFFICIENCY OF AIRCRAFT AUXILIARY POWER UNIT

TECHNICAL FIELD

The present invention relates to the monitoring of the performance of an aircraft component, and more particularly, to a method and apparatus for monitoring the turbine efficiency of an aircraft auxiliary power unit.

BACKGROUND ART

Airborne Auxiliary Power Unit, abbreviated as APU, is a small turbine engine mounted at the tail of an aircraft. Its main function is to supply power and gas sources, with a few APUs capable of providing additive thrust to the aircraft. Specifically, before taking off from the ground, an aircraft may not need to rely on a ground power supply and gas source vehicle starting up it as its main engine may be started via the power supply from the APU. While on the ground, the APU also supplies power and compressed air to ensure lighting and air-conditioning in the cabin and cockpit. During take-off of an aircraft, the APU can serve as a backup power source. After the aircraft is landed, lighting and air-conditioning of the aircraft are still maintained by power from the APU. The functions of the APU determine that the operation stability of the APU directly affects the flight cost and quality of service of the aircraft.

Since the APU is a turbine engine, the turbine efficiency is an important parameter reflecting the performance of the APU. The prior art has no effective means for evaluating the turbine efficiency of an APU so that the performance of an APU cannot be evaluated. The present invention is to provide the means for solving this problem.

SUMMARY OF THE INVENTION

For the above technical problem existing in the prior art, there is provided, according to one aspect of the present invention, a method for monitoring performance of an APU turbine efficiency of an aircraft, comprising: obtaining APU messages at multiple time points within a period; obtaining APU startup parameters including at least a rotation speed at a peak of EGT according to the APU messages; calculating a percentage NPA of the rotation speed when the exhausting gas temperature EGT reaches its peak at the APU startup stage relative to the rotation speed in the APU normal operation; calculating the average of the NPA within the period; and determining which of the stable, decline and failure phases the APU turbine efficiency is in according to the average of the NPA.

In the method, the step of determining which of the stable, decline and failure phases the APU turbine efficiency is in comprises: determining the APU turbine efficiency is in the decline phase in response to the average of the NPA within the period close to a first threshold; and determining the APU turbine efficiency is in the failure phase in response to the average of the NPA within the period close to a second threshold.

In the method, the APU is of the APS3200 type, the first and second thresholds are about 35% and 32%, respectively, and the wording of close to means the relative deference is not larger than about 1.5%.

In the method, the APU is of the GTCP131-9A type, the first and second thresholds are about 45% and 40%, respectively, and the wording of close to means the relative deference is not larger than about 2.5%.

In the method, 10-20 APU messages are obtained within the period.

The method further comprises: fitting all of the NPAs within the period, linearly or nonlinearly, and extrapolating the result of the fitting, linearly; determining that the APU turbine efficiency enters the decline phase if an intersection of the result of the linear extrapolation and the first threshold is within about one month; and determining that the APU turbine efficiency enters the failure phase if the intersection of the result of the linear extrapolation and the second threshold is within about one month.

The method further comprises: calculating a confidence interval of the NPA after the linear or nonlinear fitting.

The method further comprises: estimating a time range in which the APU turbine efficiency enters the decline or failure phase, according to the intersections of the result of the extrapolation of the confidence interval and the first and second thresholds.

The method further comprises: determining whether the exhausting gas temperature peak EGTP at the APU's startup is close to a red line value.

The method further comprises: determining whether the corrected exhausting gas temperature peak EGTP at the APU's startup is close to a red line value, wherein the EGTP is corrected by using the following formula:

EGTP_COR=((EGTP+273.5)/THITA)−273.5 where EGTP_COR is the corrected EGTP, EGTP is itself before correction, and THITA=eˆ(−((AltValue*CoverFt)/1000)/((8.51*(273.15+TATValue))/(9.8*29))).

The method further comprises: determining a startup time STA is within a normal range.

According to another aspect of the present invention, there is provided a device for monitoring performance of an APU turbine efficiency of an aircraft, comprising: a message obtaining unit for obtaining APU messages within a period; a message analyzing unit for analyzing required APU startup parameters including at least a rotation speed at a peak of EGT; and a performance monitoring unit for determining the performance of the APU turbine efficiency is in a stable, decline or failure phase according to NPA.

According to still another aspect of the present invention, there is provided a device for monitoring performance of an APU turbine efficiency of an aircraft, comprising: a processor; and a storage connecting with the processor for storing a computer-readable code, wherein the computer-readable code is run on the processor to implement the steps of: obtaining APU messages within a period; analyzing APU startup parameters including at least a rotation speed at a peak of EGT based on the messages; and determining the performance of the APU turbine efficiency is in a stable, decline or failure phase.

DESCRIPTION OF DRAWINGS

Hereinafter, preferred embodiments of the present invention will be further described with reference to the accompany drawings, wherein:

FIG. 3 illustrates an example of the A13 message of the Airbus company;

DETAILED DESCRIPTION

Figure 1:
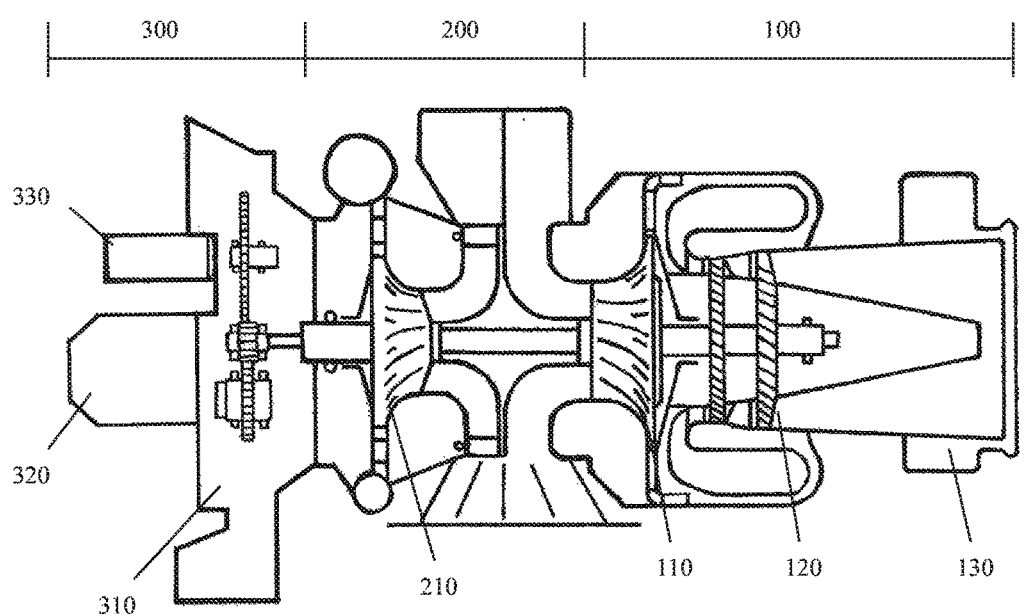
FIG. 1 is a diagram illustrating the structure of an aircraft APU according to one embodiment of the present invention.

Hereinafter, in order to give a clearer picture of the purposes, technical solutions and advantages of the embodiments of the present invention, the technical solutions in the embodiments of the present invention will be further described, taken in conjunction with the accompanying drawings in the embodiments of the present invention. Apparently, the described embodiments are only a part of the invention rather than all embodiments. Based on the embodiments described in this disclosure, all other embodiments a person with ordinary skill in the art achieves without any inventive effort shall fall within the protection scope of the present invention.

In the following detailed description, reference can be made to the accompanying drawings which are a part of this disclosure for explaining exemplary embodiments of the present invention. In the drawings, like reference numerals refer to similar components. The description of the embodiments of the present invention herein is detailed enough for the skilled in the art to practice the technical solution of the present invention. It should be understood that other examples can be applied or various changes and modifications in structural, logical or electric characteristics can be made to the examples described.

FIG. 1 is a structural diagram illustrating an APU of an aircraft according to one embodiment of the present invention. As shown in FIG. 1, the APU of the aircraft mainly comprises a power portion 100, a load portion 200 and an accessory portion 300, wherein the power portion 100 mainly comprises a power air compressor 110, a turbine assembly 120, an exhausting assembly 130 and etc, the load portion 200 mainly comprises a load air compressor 210, and the accessory portion 300 mainly comprises an accessory gear case 310, a starter 320, a generator 330 and etc. The gas flow imported from an inlet channel is divided into two flows, the first of which enters the power air compressor 110 and the turbine assembly 120 to mainly rotate the APU and then to be exhausted by the exhausting assembly 130, and the second of which enters the load air compressor 210 to be pressurized by the load compressor to generate a compressed air exclusively for the use of an aircraft. At the entrance of the airflow, there is provided with a flow regulating valve (inlet guide vane) to regulate opening degree of the valve (vane) in a real-time manner according to compressed air needed by an aircraft so as to control air flow into the load compressor.

On the start of the APU, firstly, a starter is used to rotate the turbine. When the rotation speed is larger than the ignition threshold speed, the APU begins to be supplied with oil and the APU turbine rotates acceleratedly under the force from the starter and a gas driven turbine. For example, with regard to the APS3200 type of APU, once the rotation speed of the APU reaches 5% of its normal rotation speed, the oil is supplied. With regard to the GTCP131-9A type of APU, once the rotation speed of the APU reaches 7% of its normal rotation speed, the oil is supplied. After the beginning of supplying the oil, the inside of the combustor is converted from its lean oil state to its rich oil state while the temperature in the combustor increases gradually. At the beginning stage of the startup of the APU, the amount of supplied air is small due to the low rotation speed of the fore compressor, which may result in the heat accumulation so as to reach the maximum exhausting temperature point, namely, the exhausting gas temperature peak EGTP during the startup. With the increase of the rotation speed of the turbine as a whole, the combustor is converted from its rich oil state to normal gradually, and the temperature in the combustor decreases so as to complete the startup.

The inventor found that when the turbine efficiency of the APU is low, the rotation speed of the turbine is low at the time of reaching the peak of the exhausting gas temperature EGT (i.e. the maximum temperature) at the startup stage, because a low turbine efficiency may result in an earlier occurrence of rich oil state. For example, with regard to the APS3200 type of APU, if the rotation speed at the time of the occurrence of the exhausting gas temperature peak EGTP during the startup stage is only 32% of the rotation speed of the APU in its normal operation, it means that the performance of the APU turbine declines significantly. Similarly, with regard to the GTCP131-9A type of APU, if the rotation speed at the time of the occurrence of the exhausting gas temperature peak EGTP during the startup stage is only 40% of the rotation speed of the APU in its normal operation, it means that the performance of the APU turbine declines significantly.

The inventor further found that the performance of the APU turbine efficiency varies according to the following. The turbine efficiency is stable at the earlier and medium stages of use, and deteriorates at the later stage of use until the turbine is broken down.

Figure 2:
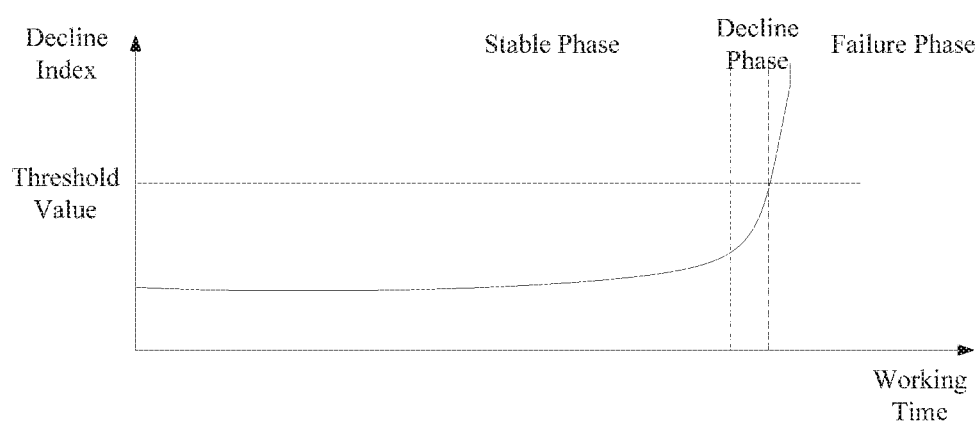
FIG. 2 is a diagram illustrating a statistic trend of the APU turbine efficiency.

FIG. 2 is a diagram illustrating the curve of the change of the APU turbine efficiency. As shown in FIG. 2, with the operation time increased, the decline index increases gradually, since the APU turbine efficiency of the aircraft deteriorates gradually. When the decline index of the APU turbine efficiency is stable, its performance is in the stable phase. When the decline of the performance of the APU turbine efficiency is accelerated gradually, its performance enters into the decline phase. When the decline index exceeds a certain threshold, its performance enters into the failure phase in which a failure may occur anytime. After the APU turbine efficiency enters into the failure phase, the use of the APU will be influenced, which is disadvantageous for the service quality and flight safety, and an unintended maintenance may occur, which may result in the delay or cancel of a scheduled flight.

The performance of the APU turbine efficiency of the aircraft may be characterized by the percentage NPA of the turbine rotation speed when the exhausting gas temperature EGT reaches its peak EGTP at the APU startup stage relative to the rotation speed in the APU normal operation.

There is no means in the prior art for monitoring whether or not the APU turbine efficiency has entered into the decline phase. Certain embodiments of the present invention may realize the monitoring. The monitoring about the decline phase has the following advantages. When the APU turbine efficiency is in the decline phase, the probability of failure is still very low. If the aircraft is maintained at this time, the flight safety and service quality can be ensured. That is, the airline company can arrange a maintenance for the aircraft, timely, so as to avoid an unintended maintenance and reduce delayed flights, and to avoid unnecessary cost waste of maintenance in a fixed interval.

The NPA can be obtained via various methods. For example, the NPA can be calculated by obtaining the rotation speed at the EGT peak at the startup stage, since any type of the APU has a constant rotation speed during its normal operation. Furthermore, the data of rotation speed at the EGT peak can be obtained from the data stored in the flight data recorder (FDR) or quick access recorder (QAR).

The above data can also be obtained from the data system provided by the aircraft manufacturer, and real-time detection on the ground can be realized. For example, running data of an aircraft can be monitored in a real-time manner via both Aircraft Condition Monitoring System (ACMS) of Airbus and Aircraft Heath Monitor (AHM) system of Boeing. Besides, when certain trigger condition is met, a message containing a series of data information can be generated automatically.

According to one embodiment of the present invention, APU-related running data can be obtained via the aircraft data system (such as ACMS or AHM systems) and be embodied in the related generated message. Such message information can be transmitted to the ground via the Aircraft Communication Addressing and Reporting System (ACARS) and further be distributed to servers of different airline companies. According to one embodiment of the present invention, the APU message may also be transmitted via the communication apparatus or system of Aviation Telecommunication Network (ATN).

In fact, for those existing flight data systems, monitoring the performance of APU is an already-included item, and thus a corresponding APU message can be generated automatically and transmitted to the ground via ACARS or ATN. However, those data monitored are not utilized for detecting the decline phase of performance of APU. For example, the A13 message of Airbus (namely, APU MES/IDLE REPORT) or the APU message of Boeing is an example of such APU message. In the following embodiment, the A13 message of Airbus is illustrated as an example. APU message of Boeing is processed in a similar way.

FIG. 3 illustrates an example of A13 message of Airbus. As shown in the figure, the A13 message mainly contains the following 4 parts of information: the header, the APU history information, the running parameters of starting the aircraft engine and the APU starting parameters.

The header is composed of CC section and C1 section, mainly including information such as flight information of aircraft, leg in which the message is generated, bleed valve status, total air temperature (i.e., external temperature), and so on. The APU history information is comprised of E1 section including APU serial number, service time and circulation and so forth. The running parameters for starting an aircraft engine is comprised of N1 to S3 sections; wherein N1 and S1 indicate the running status when the first aircraft engine is started; N2 and S2 indicate the running status when the second aircraft engine is started; N3 and S3 is the status after all engines are started and when the APU is idling. The APU starting parameters comprise the starting time of the APU, the peak of EGT, the rotation speed at the peak of EGT, the lubricant temperature and the inlet temperature of the load air compressor.

As can be seen from FIG. 3, the rotation speed at the peak of EGT, the APU running parameter, is included in the existing A13 message. Therefore, the detection of performance of the APU turbine efficiency of the present invention can be realized by utilizing data obtained in this message.

Figure 4:
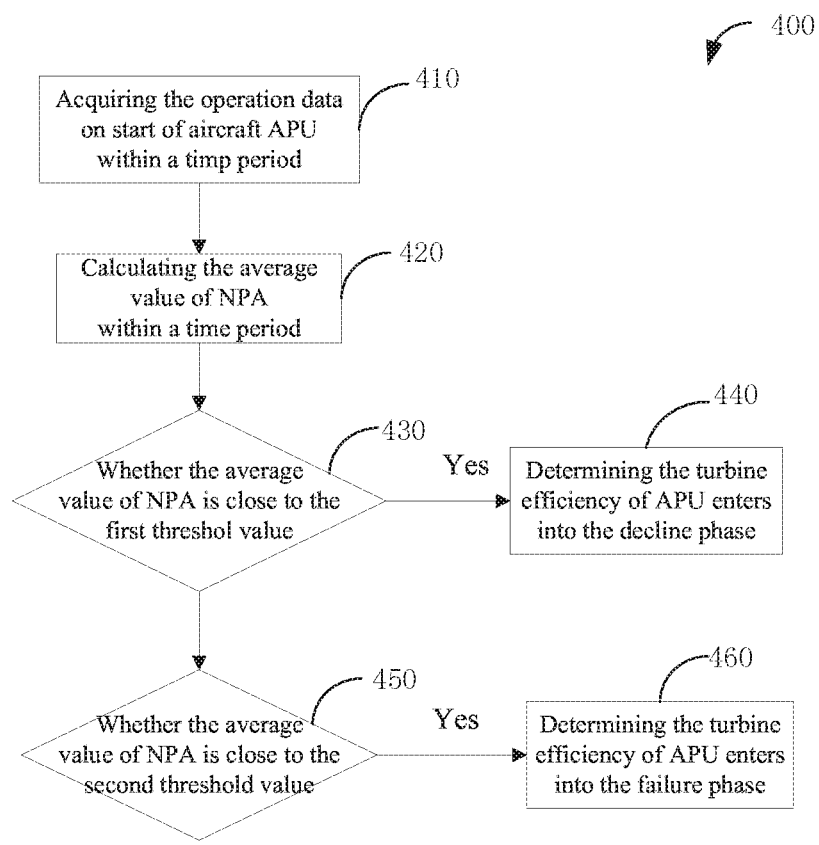
FIG. 4 is a flowchart illustrating a method for monitoring the APU turbine efficiency according to an embodiment of the present invention.

FIG. 4 is a flowchart showing a method of monitoring the APU turbine efficiency according to an embodiment of the present invention. As shown in FIG. 4, Step 410 of the method 400 of monitoring the APU turbine efficiency is to obtain the data of the status of the aircraft APU startup within a period, which comprises at least the rotation speed at the peak of EGT.

According to an example of the present invention, the information required at Step 410 can be obtained from, for example, the APU message i.e. A13 message. For example, the A13 message for the aircraft APU operation can be obtained in real time from the control center of the Society of International Telecommunications Aeronautics (SITA) or the control center of the Aviation Data Communication Corporation (ADCC) of China. The required information of the status of the aircraft APU startup can be obtained by decoding the A13 message showing the operation status of the aircraft APU by a message decoder.

Step 420 is to calculate the average of the NPA during the period according to the obtained rotation speed at the peak of EGT and the constant APU rotation speed.

Step 430 is to judge whether the average of the NPA during the period is close to a first threshold, and if the average of the NPA has been close to the first threshold, the APU turbine efficiency is determined to enter the decline phase at Step 440.

Step 450 is to judge whether the average of the NPA during the period is close to a second threshold, and if the average of the NPA has been close to the second threshold, the APU turbine efficiency is determined to enter the failure phase at Step 460.

According to an example of the present invention, with respect to the APS3200 type of APU, the first threshold is about 35%, the second threshold is about 32%, and "close to" means the difference is not larger than about 1.5%. Similarly, with respect to the GTCP131-9A type of APU, the first threshold is about 45%, the second threshold is about 40%, and "close to" means the difference is not larger than about 2.5%.

As time goes by, in the case of the length of the period being fixed, the average of the NPA becomes better and better. This can be referred to as a moving window method in which the trend is analyzed by using continuously updated data in a certain period. The size of the moving window, namely the number M of the points included in the calculation, depends on a number of factors, such as time interval between different measurements and control strategy and so forth. The smaller the moving window is, the easier the volatility of data will be affected by normal fluctuation, and thus various misinformation will occur, which will affect the technical effect of the present invention. If the moving window is overlarge, although the trend of changes will be reflected more accurately, the timeliness of the present invention will be reduced and warning information cannot be delivered timely. Therefore, the size of the moving window plays an important role in the present invention. According to one embodiment of the present invention, the value of M is around 20 on the condition that 2 to 3 points are measured in each day. According to another embodiment of the present invention, the value of M is around 10 on the condition that the number of points measured in each day is less than or equals to 2.

According to an embodiment of the present invention, different rotation speed data will be obtained at different temperatures. Thus, in order to reflect an accurate APU turbine efficiency, the influence of the temperature can be compensated by using the rotation speed comparability. The NPA can be converted to a uniform circumstance for comparison by using the following formula:

$$N_{COR} = N \times \sqrt{\frac{T_0}{T_1}}$$

where Ncor is the corrected NPA, N is the NPA before correction, T0 is the conversion temperature, and T1 is the current temperature. This makes the comparison with the threshold more accurate.

Figure 5:
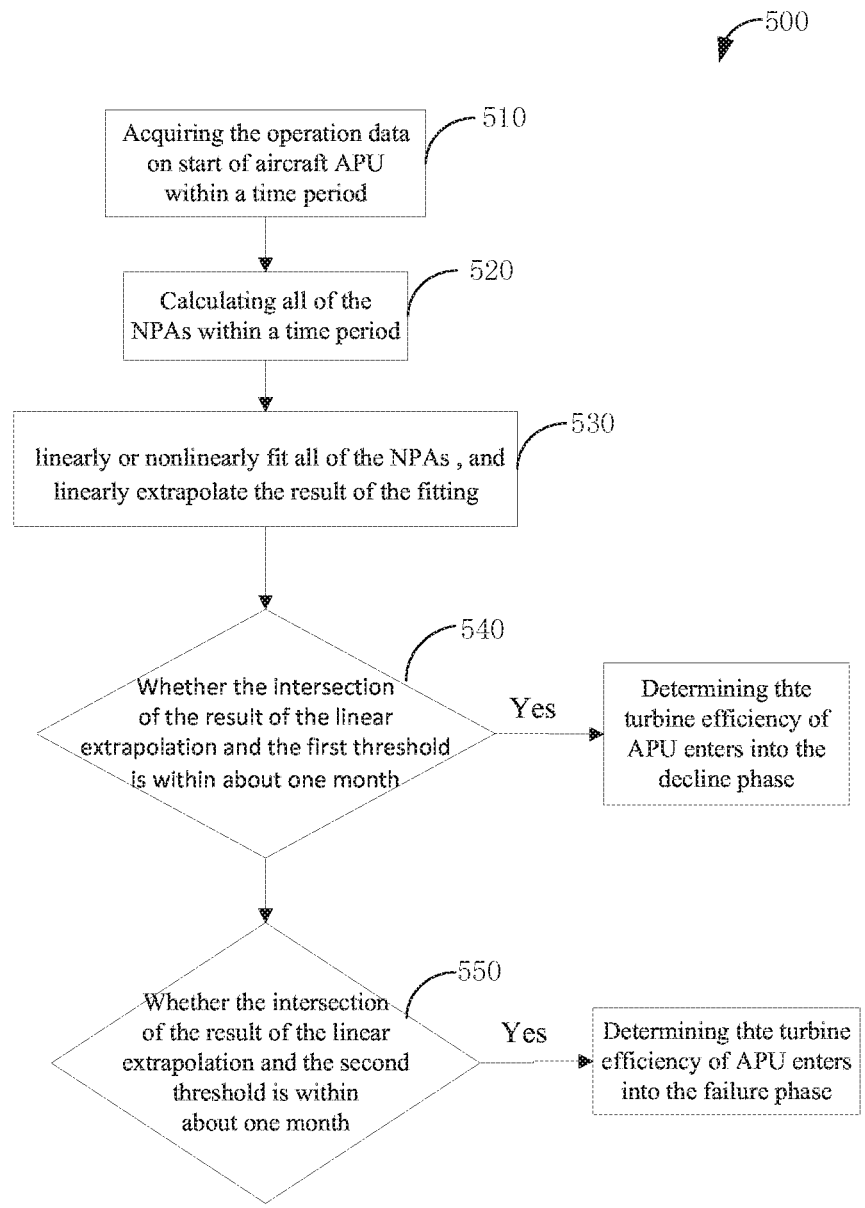
FIG. 5 is a flowchart illustrating a method for monitoring the APU turbine efficiency according to another embodiment of the present invention.

FIG. 5 is a flowchart showing a method of monitoring the APU turbine efficiency according to another embodiment of the present invention. As shown in FIG. 5, Step 510 of the method 500 of monitoring the APU turbine efficiency is to obtain the data of the status of the aircraft APU startup for a period, which comprises at least the rotation speed at the peak of EGT. According to an example of the present invention, the period is about 1-2 months.

According to an example of the present invention, the information required at Step 510 can be obtained from, for example, the APU message of the A13 message. For example, the A13 message for the aircraft APU operation can be obtained in real time from the control center of the Society of International Telecommunications Aeronautics (SITA) or the control center of the Aviation Data Communication Corporation (ADCC) of China. The required information of the status of the aircraft APU startup can be obtained by decoding the A13 message showing the operation status of the aircraft APU by a message decoder.

Step 520 is to calculate all of the NPAs during the period according to the obtained rotation speed at the peak of EGT and the constant APU rotation speed.

Step 530 is to linearly or nonlinearly fit all of the NPAs in the period, and to linearly extrapolate the result of the fitting.

Step 540 is to determine that the APU turbine efficiency enters the decline phase if the intersection of the result of the linear extrapolation and the first threshold is within about one month.

Step 550 is to determine that the APU turbine efficiency enters the failure phase if the intersection of the result of the linear extrapolation and the second threshold is within about one month. According to an example of the present invention, with respect to the APS3200 type of APU, the first threshold is about 35%, the second threshold is about 32%, and "close to" means the difference is not larger than about 1.5%. Similarly, with respect to the GTCP131-9A type of APU, the first threshold is about 45%, the second threshold is about 40%, and "close to" means the difference is not larger than about 2.5%.

According to an example of the present invention, at Steps 540 and 550, the confidence interval of the NPA is calculated after the linear or nonlinear fitting. According to the intersections of the result of the extrapolation of the confidence interval and the first and second thresholds, the time range in which the APU efficiency enters the decline or failure phase is estimated.

According to an example of the present invention, other APU startup parameters, such as the exhausting gas temperature peak EGTP at the APU's startup, also can be used to assist in judging whether the APU turbine efficiency enters the decline phase. When the turbine efficiency decreases, the exhausting gas temperature peak EGTP at the APU's startup may be close to its red line value, namely, the maximum exhausting gas temperature allowable to the APU's operation.

According to an example of the present invention, since the EGTP may be also influenced by the ambient temperature, the EGTP can be corrected by using the following formula:

$$EGTP\_COR = ((EGTP+273.5)/THITA) - 273.5$$

where EGTP_COR is the corrected EGTP, EGTP is itself before correction, and THITA=e^(-((AltValue*CoverFt)/1000)/((8.51*(273.15+TATValue))/(9.8*29))) where AltValue is the altitude (m), CoverFt is the conversion constant between the foot and meter, and TATValue is the temperature (Celsiur scale).

Figure 6:
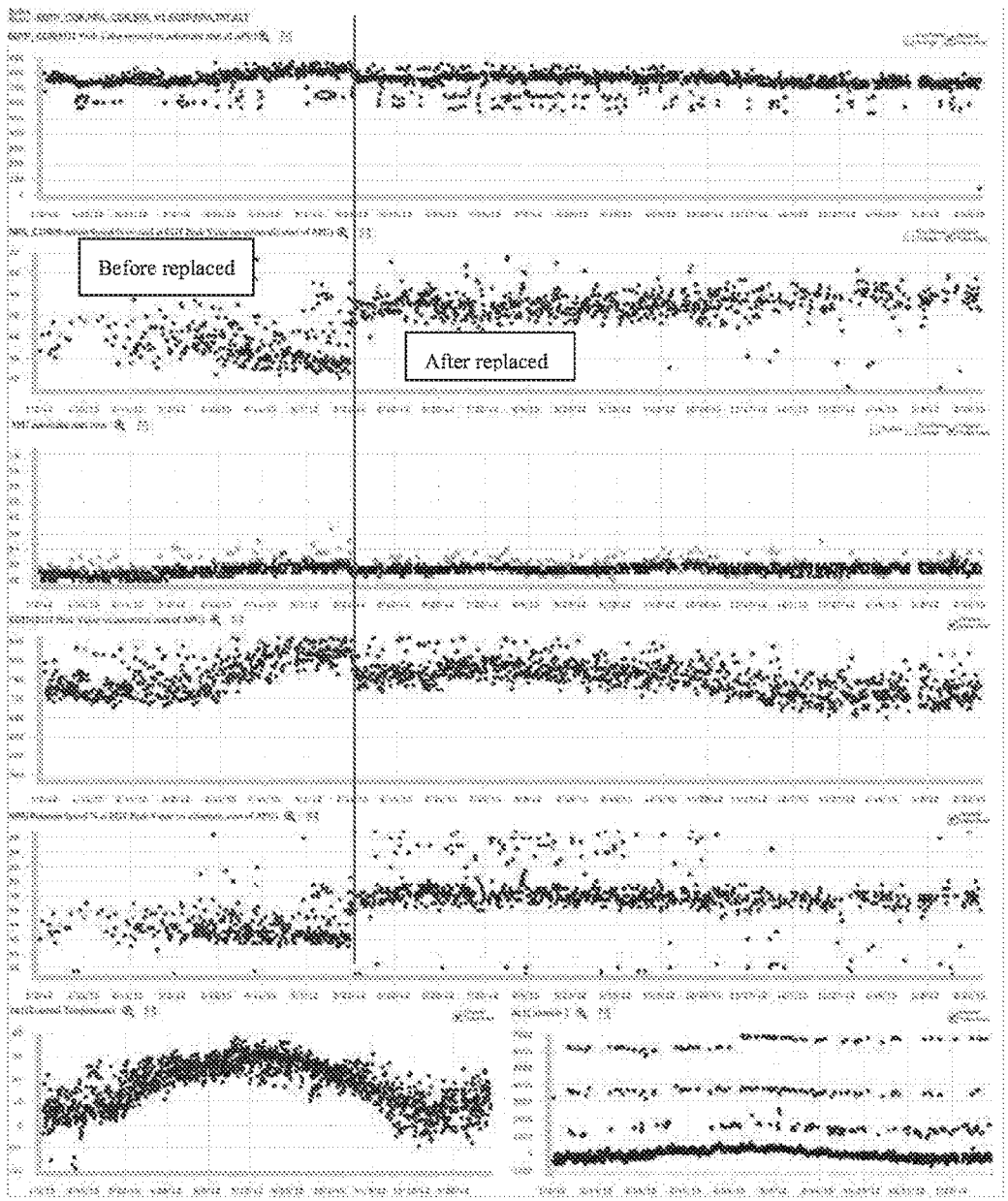
FIG. 6 illustrates an example of the change of the APU turbine efficiency according to an embodiment of the present invention.

FIG. 6 shows an example of the change of the APU turbine efficiency according to an example of the present invention, in which the APU turbine efficiency is replaced at the solid line. As shown in FIG. 6, before the APU turbine efficiency is replaced, the NPA decreases gradually to be close to and then exceed the first threshold 43%, and then the NPA is approaching the second threshold 40%. According to the above mentioned method, an alarm will be generated soon, which alarm that the APU turbine efficiency deteriorates and enters into the decline or failure phase. It should be noted that the startup time STA remains normal. The EGTA approaches the red line value 840 degree, and the corrected EGTA_cor also approaches its red line value 900 degree.

Figure 7:
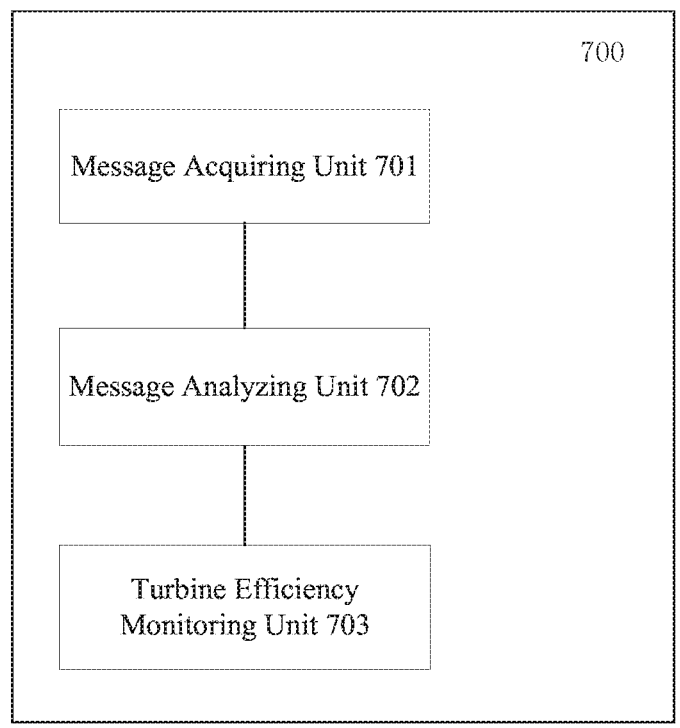
FIG. 7 is a block diagram illustrating a device for monitoring the APU turbine efficiency of an aircraft according to an embodiment of the present invention.

FIG. 7 is a block diagram illustrating a device for monitoring the APU turbine efficiency of an aircraft according to an embodiment of the present invention. As shown in FIG. 7, the device for monitoring an APU turbine efficiency comprises: a message obtaining unit 701 for obtaining APU messages within a period; a message parsing unit 702 for parsing out required operation data relating to the APU turbine efficiency; and a turbine efficiency monitoring unit 703 for determining the performance of the APU turbine efficiency is in a stable, decline or failure phase according to the operation data relating to the turbine efficiency.

According to an embodiment of the present invention, a device for monitoring performance of an APU turbine efficiency of an aircraft, comprises: a processor; and a storage connecting with the processor for storing a computer-readable code, wherein the computer-readable code is run on the processor to implement the steps of: obtaining APU messages within a period; parsing out operation data relating to the APU turbine efficiency based on the messages, the operation data including NPA; and determining the performance of the APU turbine efficiency is in a stable, decline or failure phase.

The various aspects and embodiments disclosed herein are for purposes of illustration and are not intended to be limiting. It will be understood by those skilled in the art that a variety of modifications, additions and deletions are within the scope of the invention, as defined by the following claims.

We claim:

1. A method for monitoring performance of an Auxiliary Power Unit (APU) turbine efficiency of an aircraft, comprising:
    obtaining APU messages of multiple time points within a period;
    obtaining APU startup parameters including at least a rotation speed at a peak of gas temperature (EGT) according to the APU messages;
    calculating a percentage (NPA) of the rotation speed when the exhausting gas temperature EGT reaches its peak in the APU startup stage relative to the rotation speed in the APU normal operation;

calculating an average of NPAs of the multiple time points within the period; and determining the APU turbine efficiency is in one of the stable, decline and failure phases according to the average of the NPAs.

2. The method of claim 1, wherein the determining of the APU turbine efficiency is in one of the stable, decline and failure phases comprises:

determining the APU turbine efficiency is in the decline phase in response to the average of the NPAs of the multiple time points within the period close to a first threshold; and determining the APU turbine efficiency is in the failure phase in response to the average of the NPAs of the multiple time points within the period close to a second threshold.

3. The method of claim 2, wherein the APU is an APS3200 type of APU, the first and second thresholds are about 35% and 32%, respectively, and the wording "close to" means the relative difference is not larger than about 1.5%.

4. The method of claim 2, wherein the APU is a GTCP131-9A type of APU, the first and second thresholds are about 45% and 40%, respectively, and "close to" includes the relative difference not being larger than about 2.5%.

5. The method of claim 1, wherein 10-20 APU messages are obtained within the period.

6. The method of claim 1, further comprising: fitting all of the NPAs of the multiple time points within the period, linearly or nonlinearly, and linearly extrapolating the result of the fitting; determining that the APU turbine efficiency enters the decline phase if an intersection of the result of the linear extrapolation and a first threshold is within about one month; and determining that the APU turbine efficiency enters the failure phase if the intersection of the result of the linear extrapolation and a second threshold is within about one month; wherein the first and second thresholds are empirical values, and the first threshold is less than the second threshold.

7. The method of claim 6, further comprising:

calculating a confidence interval of NPAs in the result of the fitting after the linear or nonlinear fitting.

8. The method of claim 7, further comprising:

estimating a time range in which the APU turbine efficiency enters the decline or failure phase, according to the intersections of the result of the extrapolation of the confidence interval and the first and second thresholds.

9. The method of claim 1, further comprising:

determining whether the corrected exhausting gas temperature peak EGTP at the APU's startup is close to a red line value, wherein the EGTP is corrected by using the following formula:

EGTP_COR=((EGTP+273.5)/THITA)−273.5 where EGTP_COR is the corrected EGTP, EGTP is itself before correction, and THITA=e^(−((AltValue*CoverFt)/1000)/((8.51*(273.15+TATValue))/(9.8*29))), and wherein AltValue is the altitude (m), CoverFt is the conversion constant between the foot and meter, and TATValue is the temperature (Celsius scale).

10. The method of claim 1, wherein:

a startup time (STA) remains normal.

11. A device for monitoring performance of an Auxiliary power Unit (APU) turbine efficiency of an aircraft, comprising a processor and a storage configured to store a computer readable code configured to instruct the processor the following: a message obtaining unit configured to obtain APU messages of multiple time points within a period; a message parsing unit configured to parse out APU startup parameters including at least a rotation speed at a peak of gas temperature (EGT) according to the APU messages; a performance monitoring unit configured to determine the performance of the APU turbine efficiency is in a stable, decline or failure phase by: calculating a percentage (NPA) of the rotation speed when the exhausting gas temperature EGT reaches its peak in the APU startup stage relative to the rotation speed in the APU normal operation, calculating an average of NPAs of the multiple time points within the period; and determining the APU turbine efficiency is in one of the stable, decline and failure phases according to the average of the NPAs.

12. A device for monitoring performance of an Auxiliary Power Unit (APU) turbine efficiency of an aircraft, comprising: a processor; and a storage connected with the processor configured to store a computer-readable code, wherein the computer-readable code is run on the processor to implement the steps of: obtaining APU messages of multiple time points within a period; parsing out APU startup parameters including at least a rotation speed at a peak of gas temperature (EGT) based on the APU messages; and determining the performance of the APU turbine efficiency is in a stable, decline or failure phase, the determining comprises; calculating a percentage (NPA) of the rotation speed when the exhausting gas temperature EGT reaches its peak in the APU startup stage relative to the rotation speed in the APU normal operation, calculating an average of NPAs of the multiple time points within the period, and determining the APU turbine efficiency is in the stable, decline and failure phases according to the average of the NPAs.

* * * * *